(12) United States Patent
Park et al.

(10) Patent No.: US 11,959,818 B2
(45) Date of Patent: Apr. 16, 2024

(54) EXPLOSION PRESSURE PREDICTION SYSTEM FOR MEDIUM- AND LARGE-SIZE CELL MODULE, AND METHOD FOR PREDICTING EXPLOSION PRESSURE OF MEDIUM- AND LARGE-SIZE CELL MODULE

(71) Applicant: LG CHEM, LTD., Seoul (KR)

(72) Inventors: Ji Hye Park, Daejeon (KR); Su Hyun Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 915 days.

(21) Appl. No.: 16/967,285

(22) PCT Filed: Oct. 18, 2019

(86) PCT No.: PCT/KR2019/013732
§ 371 (c)(1),
(2) Date: Aug. 4, 2020

(87) PCT Pub. No.: WO2020/085722
PCT Pub. Date: Apr. 30, 2020

(65) Prior Publication Data
US 2021/0025771 A1    Jan. 28, 2021

(30) Foreign Application Priority Data

Oct. 25, 2018  (KR) .......................... 10-2018-0128077

(51) Int. Cl.
*G01L 5/14*   (2006.01)
*G01G 5/00*   (2006.01)
(Continued)

(52) U.S. Cl.
CPC ................. *G01L 5/14* (2013.01); *G01G 5/00* (2013.01); *H01M 10/44* (2013.01); *H02J 7/0048* (2020.01)

(58) Field of Classification Search
CPC ............ G01L 5/14; G01L 1/02; H02J 7/0048; H01M 10/44; G60R 21/015; B60R 2021/01516; G01G 5/00; G01G 5/003
(Continued)

(56) References Cited

U.S. PATENT DOCUMENTS

2021/0025771 A1*   1/2021   Park ..................... H01M 10/42

FOREIGN PATENT DOCUMENTS

CN     101261312 B  *  6/2010
CN     105092643 A     11/2015
(Continued)

OTHER PUBLICATIONS

Abbasalinejad et al., Thermal Phenomena in Lithium-Ion Batteries, Washington State University, Jun. 3, 2020, p. 112 (Year: 2020).*
(Continued)

*Primary Examiner* — Stephanie E Bloss
*Assistant Examiner* — Kevin C Butler
(74) *Attorney, Agent, or Firm* — Morgan, Lewis & Bockius LLP

(57) ABSTRACT

A method for predicting the explosion pressure of a medium- and large-size cell module, according to the present invention, comprises the steps of: (S100) deriving a profile (SOC-temperature profile) of the generation temperature according to a state of charge (SOC) of a medium- and large-size cell module to be predicted; (S200) mounting a small cell inside an explosion pressure measurement device; (S300) overcharging the small cell until an explosion occurs while heating the small cell in the same manner as the SOC-temperature profile derived in step (S100); (S400)
(Continued)

measuring the pressure during the explosion of the small cell; and (S500) converting the pressure during the explosion of the measured small cell into pressure of a medium- and large-size cell module.

12 Claims, 6 Drawing Sheets

(51) Int. Cl.
  *H01M 10/44* (2006.01)
  *H02J 7/00* (2006.01)
(58) Field of Classification Search
  USPC .................................................. 73/862.581
  See application file for complete search history.

(56) References Cited

FOREIGN PATENT DOCUMENTS

| | | | | |
|---|---|---|---|---|
| CN | 105092643 A | * | 11/2015 | |
| CN | 107677966 A | * | 2/2018 | |
| CN | 108390112 A | | 8/2018 | |
| CN | 108390112 A | * | 8/2018 | |
| CN | 113325126 A | * | 8/2021 | ............... G01L 5/14 |
| KR | 10-1997-0054649 A | | 7/1997 | |
| KR | 970054649 A | * | 7/1997 | |
| KR | 10-0832245 B1 | | 5/2008 | |
| KR | 100832245 B1 | * | 5/2008 | ........ H01M 10/4228 |
| KR | 10-2010-0118189 A | | 11/2010 | |
| KR | 101081427 B1 | * | 11/2010 | ............... G01M 7/08 |
| KR | 20100118189 A | * | 6/2012 | ............... G06Q 40/12 |
| KR | 10-1384847 B1 | | 4/2014 | |
| KR | 101841803 B1 | * | 3/2016 | .......... H01M 10/058 |
| KR | 10-2017-0083214 A | | 7/2017 | |
| KR | 20160032843 A | * | 9/2017 | |
| KR | 10-1841803 B1 | | 3/2018 | |
| KR | 20200046786 A | * | 9/2021 | |
| KR | 20220018676 A | * | 2/2022 | ........ H01M 10/4285 |
| KR | 20220037745 A | * | 3/2022 | ............... G01L 5/14 |
| KR | 20220111453 A | * | 8/2022 | ................ A62C 3/16 |
| KR | 20230004032 A | * | 1/2023 | ............... G01L 5/14 |
| WO | 2006/088021 A1 | | 8/2006 | |
| WO | WO-2006088021 A1 | * | 8/2006 | ........ H01M 10/4285 |
| WO | WO-2020085667 A1 | * | 4/2020 | ......... G01R 31/3648 |
| WO | WO-2020085722 A1 | * | 4/2020 | ............... G01L 5/14 |

OTHER PUBLICATIONS

Farag et al, Combined electrochemical, heat generation, and thermal model for large prismatic lithium-ion batteries in real-time applications, Journal of Power Sources, 360 (2017), pp. 618-633 (Year: 2017).*

Kupper et al, Combined modeling and experimental study of the high-temperature behavior of a lithium-ion cell: Differential scanning calorimetry, accelerating rate calorimetry and external short circuit, Electrochimica Acta, 306 (2019), pp. 209-219 (Year: 2019).*

Ghalkhani et al., Electrochemical-Thermal Model of Pouch-type Lithium-ion Batteries, Electrochimica Acta, 247 (2017), pp. 569-587 (Year: 2017).*

Chen et al, Thermal runaway modeling of LiNi0.6Mn0.2Co0.2O2/graphite batteries under different states of charge, Journal of Energy Storage, 49 (2022) 104090, p. 11 (Year: 2022).*

Sheikh et al., State of Charge Dependent Thermal Runaway Detection of Lithium-Ion Battery Under Mechanical Abuse Conditions, Thesis Submitted University of Sunderland for the degree of Doctor of Philosophy, University of Sutherland, (2018), p. 256 (Year: 2018).*

Narula et al., Non-Invasive Estimation of Lithium-Ion Cell Thermo-Physical Properties, Thesis by Karan Narula Texas A&M Univeristy for the Degree of Master of Science, Texas A&M, (2017), p. 115 (Year: 2017).*

Shen et al., One-Dimensional Modeling and Experimental Analysis of Nail Penetration Thermal Runaway for Large Capacity Li-Ion Power Battery, Journal of The Electrochemical Society, 169 (2022) 040502, p. 12 (Year: 2022).*

Jhu et al., Thermal runaway potential of LiCoO2 and Li(Ni1/3Co1/3Mn1/3)O2 batteries determined with adiabatic calorimetry methodology, Applied Energy 100 (2012), p. 127-131 (Year: 2012).*

Ahmad et al., Thermal Runaway State in Lithium Ion Batteries of Electric Vehicles: An Overview, IEEE, 2022, p. 6 (Year: 2022).*

Hosseinzadeh et al., A systematic approach for electrochemical-thermal modelling of a large format lithium-ion battery for electric vehicle application, Journal of Power Sources 382 (2018), pp. 77-94 (Year: 2018).*

International Search Report (with partial translation) and Written Opinion issued in corresponding International Patent Application No. PCT/KR2019/013732, dated Jan. 28, 2020.

* cited by examiner

[FIG. 1]
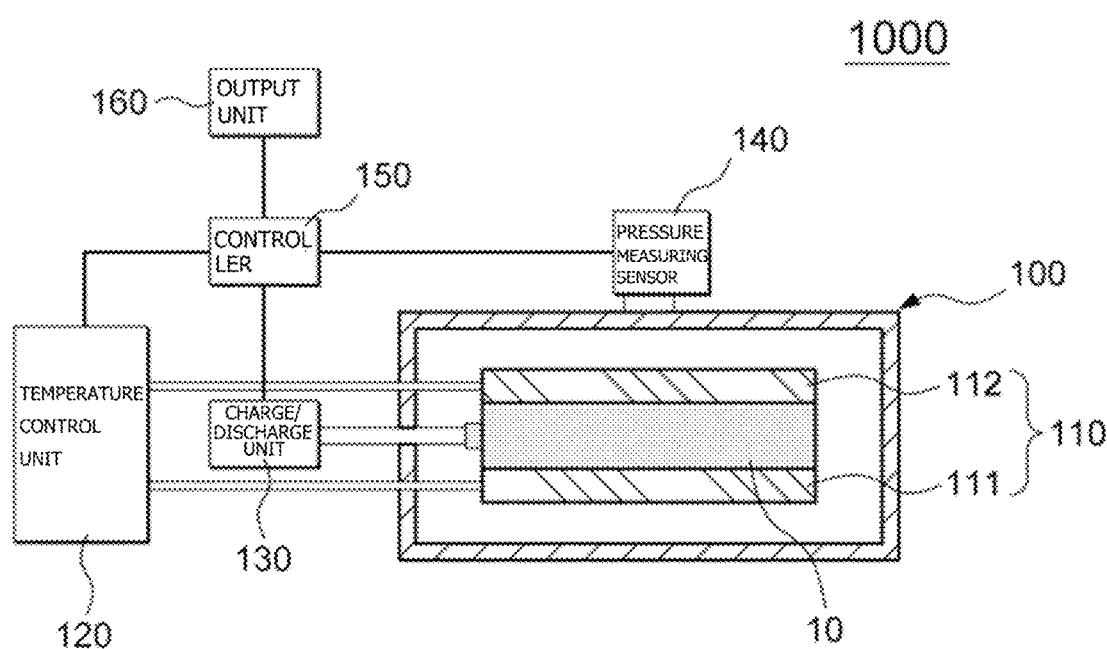

[FIG. 2]
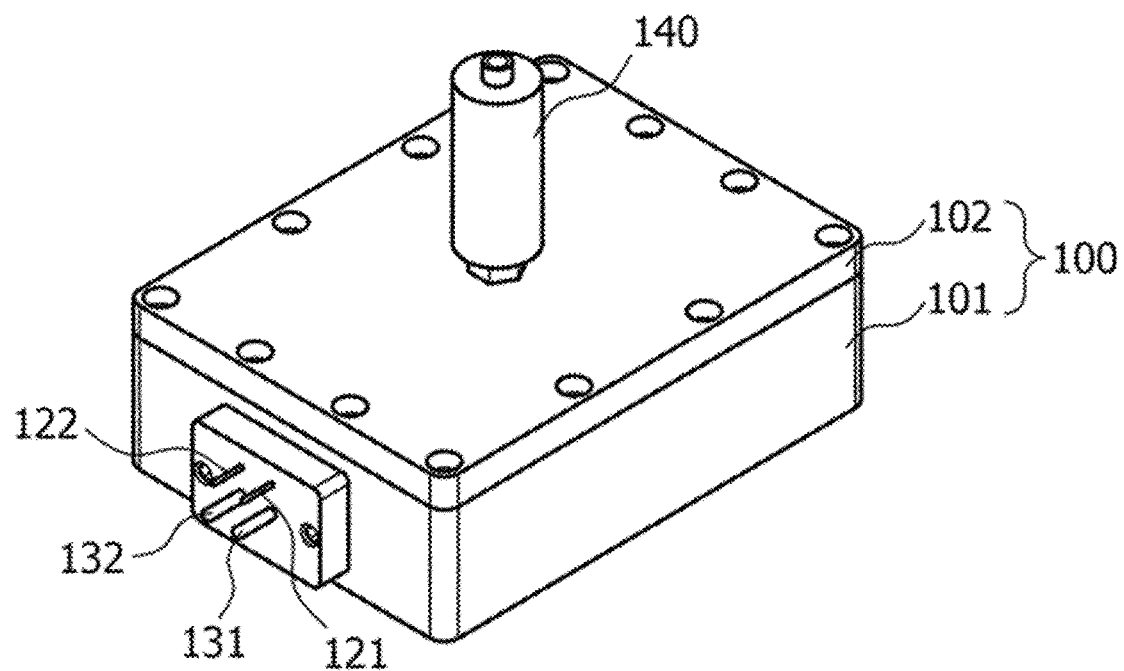

[FIG. 3]
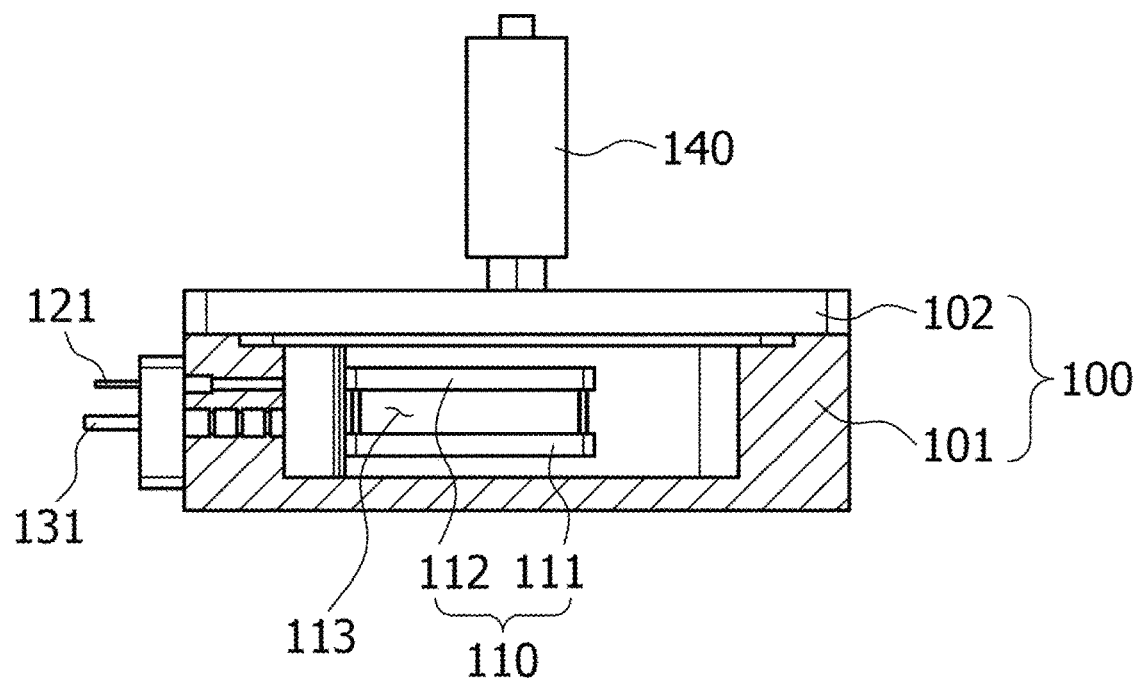

[FIG. 4]
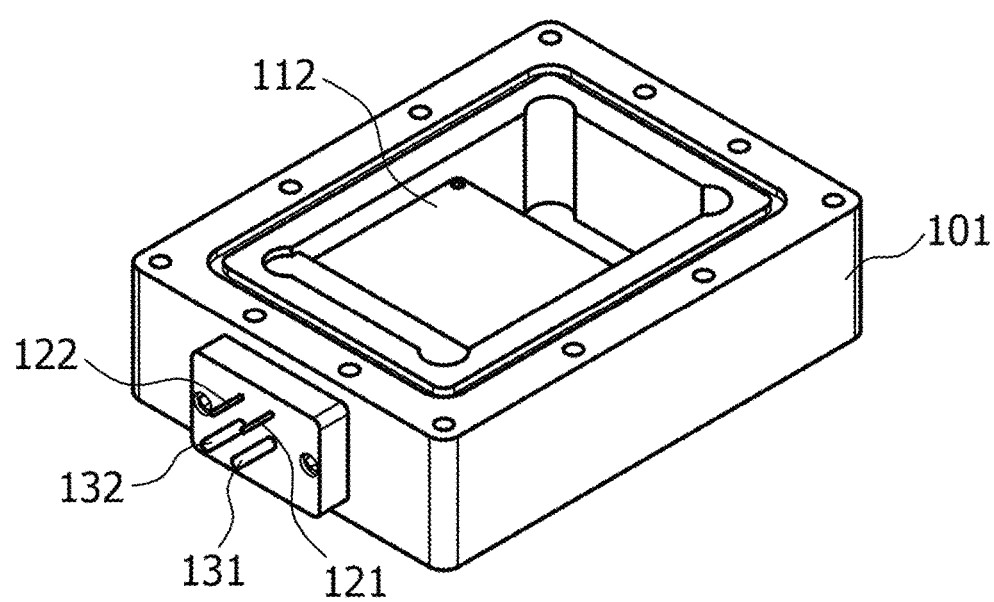

[FIG. 5]
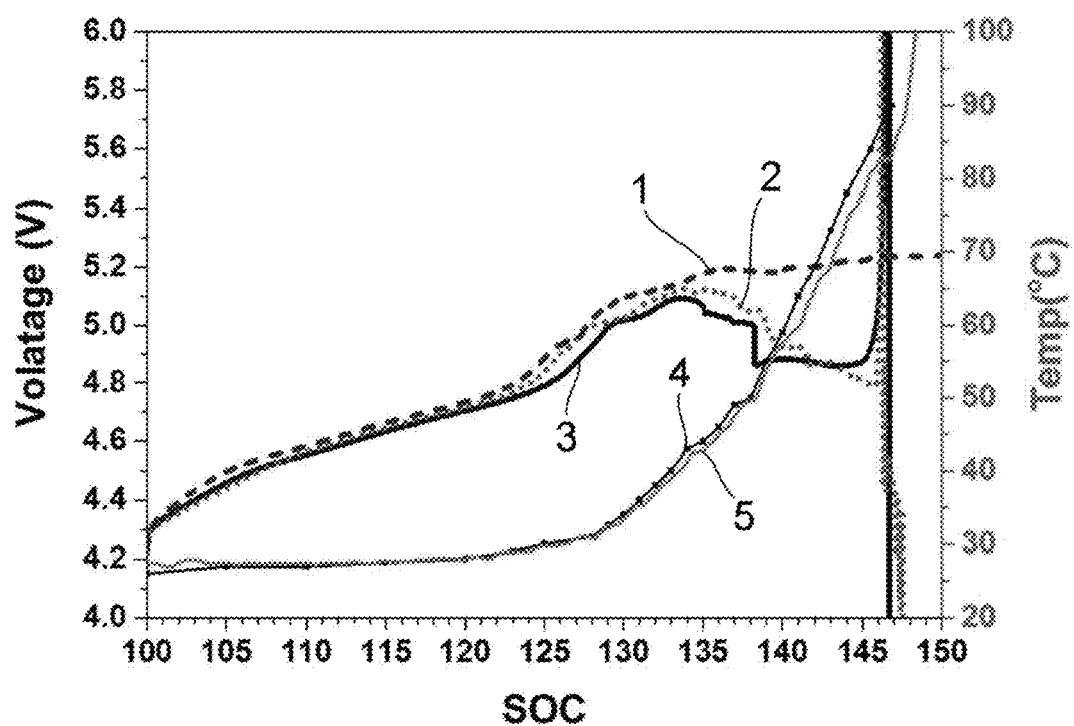

[FIG. 6]
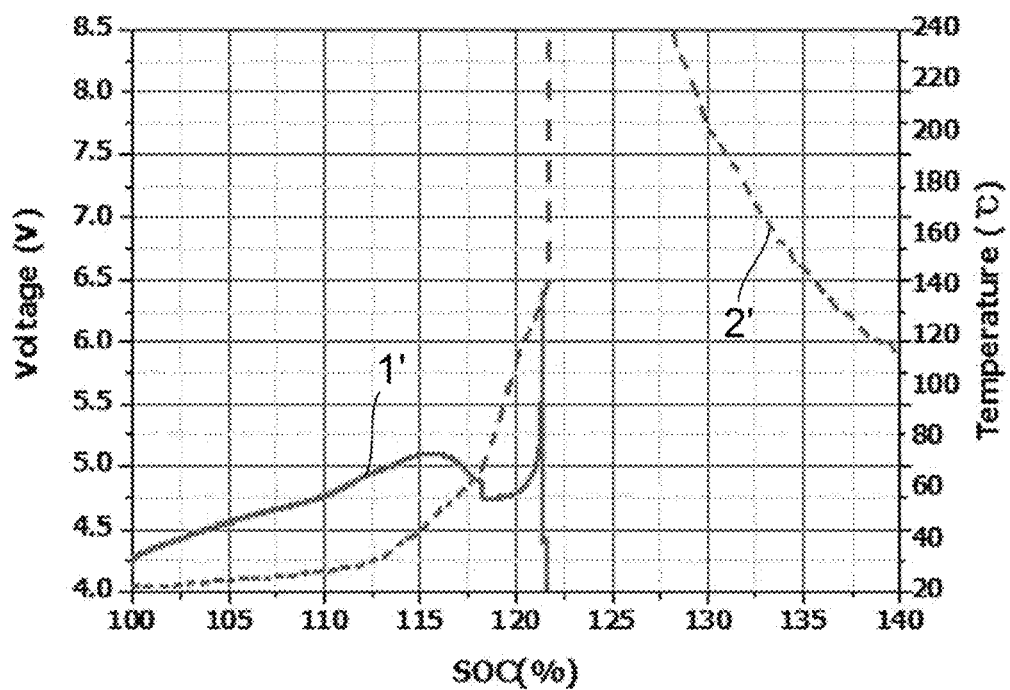

//EXPLOSION PRESSURE PREDICTION SYSTEM FOR MEDIUM- AND LARGE-SIZE CELL MODULE, AND METHOD FOR PREDICTING EXPLOSION PRESSURE OF MEDIUM- AND LARGE-SIZE CELL MODULE

TECHNICAL FIELD

This application claims the benefit of priority based on Korean Patent Application No. 10-2018-0128077, filed on Oct. 25, 2018, and the entire contents of the Korean patent application are incorporated herein by reference.

The present invention relates to a system for predicting an explosion pressure of a medium-large cell module, and relates to a method for predicting explosion pressure of a small cell and calculating and predicting an explosion pressure of a medium-large cell module using the system.

BACKGROUND ART

Recently, secondary batteries capable of charging and discharging have been widely used as energy sources of wireless mobile devices. In addition, the secondary battery has attracted attention as an energy source of an electric vehicle, a hybrid electric vehicle, etc., which are proposed as a solution for air pollution of existing gasoline vehicles and diesel vehicles using fossil fuel.

Small devices such as mobile phones and cameras use small battery packs packed with one secondary battery cell, whereas medium and large devices such as laptops and electric vehicles use medium or large battery packs in which two or more secondary battery cells are connected in parallel and/or in series.

Such secondary batteries may be classified into lithium ion batteries, lithium ion polymer batteries, lithium polymer batteries, etc., depending on the composition of the electrode and the electrolyte, and among them, the amount of use of lithium-ion polymer batteries that are less likely to leak electrolyte and are easy to manufacture is on the increase.

On the other hand, the lithium secondary battery has a problem of low safety while having excellent electrical properties. For example, lithium secondary batteries generate heat and gas due to decomposition reaction of active materials and electrolytes, which are battery components, under abnormal operating conditions such as overcharge, overdischarge, exposure to high temperatures, and the resulting high temperature and high pressure conditions further promote the decomposition reaction and sometimes cause a fire or explosion.

Such a safety problem of a lithium secondary battery is more serious in the medium-large cell module of the multi-cell structure. It is because a large number of battery cells are used in a cell module having a multi-cell structure, so that an abnormal operation in some battery cells may cause a chain reaction to other battery cells, and ignition and explosion due thereto may result in large accidents.

For this reason, the need for safety evaluation according to overcharging, high temperature exposure, etc. of medium and large cell modules is increasing, and in particular, the necessity of measuring pressure and the like during explosion of medium and large cell modules is emerging. However, the explosion of such a medium-large cell module has a risk of a large accident by the chain reaction as described above and due to structural deformation of the measuring device, it is difficult to measure the pressure during the explosion.

Therefore, in measuring the explosion pressure of the medium-large-sized cell module, there is a demand for a method for securing the safety of the measurer and the measurement device from the risk of ignition and explosion of the battery when the battery is overcharged and exposed to high temperature.

DISCLOSURE

Technical Problem

An object of the present invention is to provide a system that can predict the explosion pressure of medium and large cells by measuring the pressure at the time of explosion of small cells while simulating under the same conditions as the safety conditions of medium and large cells by using small cells.

Further, an object of the present invention is to provide a method for preventing accidents caused by fire or explosion of medium-large cell modules, and structural deformation of the measuring device, by measuring the explosion pressure of a small cell using the system and then calculating the explosion pressure of the medium-large cell module from the measured explosion pressure.

Technical Solution

A method for predicting an explosion pressure of a medium-large cell module according to an embodiment of the present invention may include: deriving a profile (SOC-temperature profile) of a generated temperature according to a charge amount (SOC) of a medium-large cell module to be predicted (S100); mounting a small cell inside an explosion pressure measuring device (S200); heating the small cell in a same manner as the SOC-temperature profile derived in step S100 and overcharging the small cell until the small cell is exploded (S300); measuring a pressure when the small cell is exploded (S400); and converting the measured pressure of the small cell into a pressure of the medium-large cell module (S500).

Herein, in the step of converting the measured pressure (S500), a pressure of the medium-large cell module may be calculated by the following equation.

$$P_{md} = P_s \times \frac{C_{ml}}{C_s} \times N_{md} \quad \text{[Equation]}$$

In the above equation, $P_{md}$ is the explosion pressure of the medium-large cell module, $P_s$ is the explosion pressure of the small cell, $C_{ml}$ is the capacity of the medium-large cell, $C_s$ is the capacity of the small cell, and $N_{md}$ is the number of cells of the medium-large cell module.

In the step of deriving the SOC-temperature profile (S100), the SOC-temperature profile may be different by capacities of the medium-large cell module.

The small cell may have a capacity of 1.0 Ah or less, and the medium-large cell module may include one or more medium-large cells having a capacity of 20 Ah or more, and the medium-large cells may be electrically connected to each other.

In the step of overcharging the small cell (S300), a charging current may be applied and at the same time, a voltage of the small cell may be measured in real time.

The medium-large cell module may be used as a power source of an electric vehicle, a hybrid electric vehicle, a plug-in hybrid electric vehicle, or a power storage device.

Meanwhile, a system for predicting an explosion pressure of a medium-large cell module according to an embodiment of the present invention may include: a chamber having a heating member disposed therein and including a mounting portion for mounting a small cell on the heating member; a temperature control unit connected to the heating member to adjust a temperature of the heating member; a charge/discharge unit electrically connected to the small cell; and a pressure measuring sensor located on one side of the chamber, and the system may be used for the method for predicting an explosion pressure.

Herein, the heating member may include a first heating plate and a second heating plate, and a mounting portion may be provided between the first heating plate and the second heating plate.

Further, the chamber may have a through portion formed at one side, and may be connected to the pressure measuring sensor through the through portion.

The chamber may include: a chamber body having a hollow structure with an open top; and a chamber cover coupled with an opening of the chamber body to seal the mounted small cell.

Further, the system may further include a controller configured to control the temperature control unit, the charge/discharge unit, and the pressure measuring sensor, and the controller may control the charge/discharge unit and the temperature control unit in order to heat the small cell in a same manner as a SOC-temperature profile of the medium-large cell module.

In addition, the system may further include an output unit configured to convert a pressure of the small cell measured by the pressure measuring sensor to a pressure of the medium-large cell module.

Advantageous Effects

According to a prediction method and prediction system of the present invention, a pressure can be recognized when a medium-large cell module is exploded without directly measuring the explosion pressure of the medium-large cell module because it is possible to predict the explosion pressure of the medium-large cell module by measuring a pressure at the time of explosion of a small cell and converting the pressure into the explosion pressure of the medium-large cell module by using the system and method capable of simulating the small cell under the same safety conditions as those of the medium-large cell module.

In addition, the present invention has the effect of preventing accidents, structural deformation of the measuring device, etc. due to the explosion, etc. that may occur in the case of directly measuring the explosion pressure of the medium-large cell module.

In addition, as it is possible to simulate the safety conditions of medium-large cells and modules from small cells, it may be applied to experiments related to safety evaluation other than pressure measurement at the time of cell explosion, or may also be applied to evaluation and analysis up to a certain time point after ignition and explosion of the cells.

BRIEF DESCRIPTION OF THE DRAWINGS

FIG. 1 is a schematic diagram of an explosion pressure measuring system of a medium-large cell module according to an exemplary embodiment of the present invention.

FIGS. 2 and 3 are perspective views showing an explosion pressure measuring system of the medium-large cell module according to an embodiment of the present invention.

FIG. 4 is a cross-sectional view of the explosion pressure measuring system of the medium-large cell module according to an example of the present invention.

FIG. 5 illustrates voltage and temperature profiles according to charge amounts of Examples 1 and 3 and Reference Example 1.

FIG. 6 shows the voltage and temperature profiles according to the amount of charge in Example 2.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In describing the drawings, similar reference numerals are used for similar elements. In the accompanying drawings, the dimensions of the structures are shown in an enlarged scale for clarity of the invention. Terms such as "first" and "second" may be used to describe various components, but the components should not be limited by the terms. The terms are used only for the purpose of distinguishing one component from another. For example, without departing from the scope of the present invention, a first component may be referred to as a second component, and similarly, the second component may also be referred to as the first component. Singular expressions include plural expressions unless the context clearly indicates otherwise.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, an explosion pressure prediction method of a medium-large cell module using an explosion pressure prediction system 1000 of a medium-large cell module according to an embodiment of the present invention will be described with reference to the drawings.

In this case, the explosion pressure prediction system 1000 of the medium-large cell module described below will be described as an example of a system used in the explosion pressure prediction method of the medium-large cell module, but is not limited thereto.

FIG. 1 is a schematic diagram of an explosion pressure measuring system of a medium-large cell module according to an exemplary embodiment of the present invention, FIGS.

2 and 3 are perspective views showing an explosion pressure measuring system of the medium-large cell module according to an embodiment of the present invention, and FIG. 4 is a cross-sectional view of the explosion pressure measuring system of the medium-large cell module according to an example of the present invention. FIGS. 2 to 4 illustrate only a part of the temperature control device 120, excluding a temperature control unit 120, a charge/discharge unit 130, a controller 150 and an output unit 160

A method for predicting an explosion pressure of a medium-large cell module according to an embodiment of the present invention may include: deriving a profile (SOC-temperature profile) of a generated temperature according to a charge amount (SOC) of a medium-large cell module to be predicted (S100); mounting a small cell inside an explosion pressure measuring device (S200); heating the small cell in a same manner as the SOC-temperature profile derived in step S100 and overcharging the small cell until the small cell is exploded (S300); measuring a pressure when the small cell is exploded (S400); and converting the measured pressure of the small cell into a pressure of the medium-large cell module (S500).

In general, a large number of battery cells are used in a medium-large cell module having a multi-cell structure, so that an abnormal operation in some battery cells may cause a chain reaction to other battery cells, and ignition and explosion due thereto may result in large accidents. For this reason, the need for safety evaluation according to overcharging, high temperature exposure, etc. of medium and large cell modules is increasing, and in particular, the necessity of measuring pressure and the like during explosion of medium and large cell modules is emerging. However, the explosion of such a medium-large cell module has a risk of a large accident by the chain reaction as described above and due to structural deformation of the measuring device, it is difficult to measure the pressure during the explosion.

Therefore, the present invention does not directly measure the explosion pressure of the medium-large cell module, but predicts the explosion pressure of the medium-large cell module from the explosion pressure of the small cell. Specifically, according to the present invention, when overcharging to induce explosion of a small cell, the small cell is heated and overcharged to simulate the medium-large cell module to thereby measure the pressure at the explosion of the small cell, then calculate the explosion pressure of the medium-large cell module from the measured explosion pressure to predict the explosion pressure of the medium-large cell module. Accordingly, according to the present invention, it is possible to prevent accidents, and structural deformation of the measuring device, etc. which are caused by ignition, explosion, etc. of the medium-large cell modules.

In the present invention, in the step of overcharging by applying a charging current to the small cell (S300), the small cell is heated. At this time, in order to simulate the medium-large cell module, it is important to adjust the temperature condition according to the SOC of the small cell in the same manner as the profile of the generated temperature according to the charge amount (SOC) of the medium-large cell module to be predicted (SOC-temperature profile).

In general, small cells having a capacity of 1.0 Ah or less do not cause explosion by overcharging alone. In order to simulate a small cell as a medium-large cell module, it is necessary to overcharge under the same or similar conditions as the temperature or voltage profile according to the SOC of the medium-large cell module. In the present invention, by controlling the temperature conditions according to the amount of charge that is easy to control, the small cell simulates the overcharging of the medium-large cell.

Therefore, in order to predict the explosion pressure of the medium-large cell module according to the prediction method of the present invention, it is necessary to first derive a temperature profile (SOC-temperature profile) according to the charge amount of the medium-large cell module to be predicted. Accordingly, the present invention requires a step (S100) of deriving a profile (SOC-temperature profile) of the generated temperature according to the charge amount (SOC) of the medium-large cell module before mounting the small cell to the pressure measuring device (S200).

The step of mounting the small cell in the explosion pressure measuring device (S200) may be a step of mounting a small cell 10 for the simulation of the medium-large cell module to become the subject of explosion pressure prediction inside the explosion pressure prediction system 1000 of the present invention.

The small cell 10 is used in a small device such as a mobile phone or a camera, and may be a cell having a capacity of 1.0 Ah or less, but is not limited thereto. In addition, the appearance of the cell is not limited, but can be cylindrical type, square type, pouch type, coin type, etc. using a can.

Meanwhile, referring to FIG. 3, the explosion pressure prediction system 1000 of the present invention has a heating member 110 disposed therein, and may include a chamber 100 including a mounting portion 113 for mounting the small cell 10 on the heating member 110. In this case, the small cell 10 may be mounted on the mounting portion 113.

The chamber 100 may include a chamber body 101 and a chamber cover 102. In this case, the chamber body 101 may have a hollow structure with an open top. In addition, the chamber body 101 is not limited in planar shape and size, and may be a cube or a cuboid in shape and size in which the heating member 110 and the small cell 10 are mounted therein. The chamber cover 102 may be combined with an opening of the chamber body 101 to seal the small cell 10 mounted inside the chamber body 101. The chamber body 101 and the chamber cover 102 are not particularly limited as long as the chamber body and the chamber cover can be firmly coupled, but may be coupled by fixing means such as fixing pins, screws, and bolts. In addition, an O-ring or the like may be further used between the chamber body 101 and the chamber cover 102 in order to increase the coupling force of the chamber body 101 and the chamber cover 102. The inner surface of the chamber 100 may be an insulating and heat-insulating material, and a material resistant to high temperature and high pressure, and non-limiting examples thereof may be bakelite, teflon, aerosol, or the like. The outer surface surrounding the inner surface may be made of a material such as stainless steel or metal. Meanwhile, the inside of the chamber 100 may be formed in a vacuum state so as to derive a more accurate result value.

The step of heating the small cell 10 and overcharging until the explosion (S300) is a step of inducing an explosion of the small cell 10 by applying a charging current to the small cell 10 and is characterized in adjusting the heating temperature of the small cell under the same conditions as the profile obtained in the step of deriving the SOC-temperature profile of step S100 in order to simulate the medium-large cell module. And overcharging may be performed until the explosion of the small cell 10.

In this case, overcharging may be performed by the charge/discharge unit 130 of the explosion pressure prediction system 1000. Referring to FIGS. 2 to 4, the charge/ discharge unit 130 may include a power supply unit and a measuring unit. The power supply unit may be electrically connected to the small cell 10 through the charge/discharge terminals 131 and 132. Specifically, charge/discharge terminals 131 and 132 are provided at one side of the chamber 100, and the power supply unit may be electrically connected to the electrodes of the small cell 10 in which the charge/discharge terminals 131 and 132 are mounted to thereby perform charge/discharge. In addition, the measuring unit may measure the charge rate and/or charged/discharged voltage of the small cell 10. Thus, in the step of overcharging (S300), while applying a current to the small cell 10, the amount of charge (SOC) and or the voltage of the small cell 10 can be measured in real time. The charge/discharge unit 130 may be configured to be controlled by the controller 150, and charge/discharge and measurement may be performed by a user signal inputted to the controller 150.

Referring to FIG. 5, in the case of a small cell that is simply overcharged without heating, it may be different from the medium and large module voltages, and it may be confirmed that the explosion does not occur even after the medium and large module explosion time. Accordingly, the present invention is characterized in that the temperature of the small cell is controlled to be the same as the temperature profile of the medium-large module so that the small cell has the same SOC-temperature profile and/or SOC-voltage profile as the medium-large module. By adjusting the temperature of the heating member 110 according to the charging amount in the same manner as the SOC-temperature profile of the medium-large cell module derived in step S100, the temperature according to the charge amount of the small cell becomes equal to the SOC-temperature profile and/or SOC-voltage profile derived in step S100. As a result, simulation of the medium-large cell module becomes possible, and the small cell makes it possible to predict the explosion pressure of medium and large cell modules.

At this time, the control temperature may be changed depending on the temperature profile of the medium-large cell module that is the pressure prediction target, but in one embodiment of the present invention, the control temperature can be adjusted to be heated to 20 to 150° C., which is a temperature range that the explosion of the small cell 10 and the medium-large cell module can occur.

On the other hand, the temperature of the heating member 110 may be adjusted by the temperature control unit 120 which is connected to the heating member 110. In this case, the heating member 110 may be electrically connected to the temperature control unit 120 through the terminals 121 and 122. In addition, the temperature control unit 120 may adjust the temperature to have the same behavior as the generated temperature profile according to the charge amount of the medium-large cell module which is a measurement target stored in advance in the controller 150 or the data storage device (not shown), which may be adjusted by a user signal inputted to the controller 150. As described above, since the temperature of the heating member 110 should be adjusted according to the charge amount, the heating of the heating member 110 may be started at the same time as the overcharging is started, and the overcharging and the temperature control of the heating member 110 may be performed simultaneously.

The heating member 110 may include a first heating plate 111 and a second heating plate 112, and the first heating plate 111 and the second heating plate 112 may be disposed with the mounting portion 113 on which the small cell 10 is mounted therebetween. Specifically, the first heating plate 111 may be disposed to contact one surface of the mounted small cell 10, and the second heating plate 112 may be disposed to contact the other surface of the mounted small cell 10.

FIG. 4 illustrates a structure in which the first heating plate 111, the mounting portion 113, and the second heating plate 112 are arranged in order from the lower surface of the chamber 100, but it may be a structure arranged sequentially from the side of the chamber 100, and the mounting position thereof may be changed. However, as the mounting positions of the first heating plate 111, the mounting portion 113, and the second heating plate 112 are changed, the mounting positions of temperature control unit 120 connected to the first heating plate 111 and the second heating plate 112, and the charge/discharge unit 130 connected to the small cell 10 mounted on the mounting portion 113 may be changed.

The first heating plate 111 and the second heating plate 112 may be a plate-shaped plate in which a surface where the small cell 10 to be mounted contacts is formed in a plane. In this case, the first heating plate 111 and the second heating plate 112 may have a width equal to or larger than the width of the small cell 10 contacting the first heating plate 111 and the second heating plate 112. In addition, the first heating plate 111 and the second heating plate 112 may be formed of a metal material, and non-limiting examples of the metal material may be various metals such as aluminum and an aluminum alloy. In addition, the heating of the first heating plate 111 and the second heating plate 112 may be performed as a structure in which a heating wire is embedded therein, and may be performed in a structure in which heat is applied to the small cell 10 mounted on the mounting portion 113.

The step of measuring the pressure (S400) may be a step of measuring the pressure according to the volume change caused by the explosion of the small cell 10. In the previous step, as the small cell 100 is overcharged and heated, the charge is driven by the electrochemical reaction of the active material, the electrode, the electrolyte, etc. in the cell, and the small cell 10 is ignited or exploded due to an internal electrochemical reaction during overcharging and heating. As a result, the small cell 10 will explode, and the pressure received by the small cell 10 at the time of explosion can be measured by the pressure measuring sensor 140.

The pressure measuring sensor 140 may be located at one side of the chamber 100. FIGS. 2 and 3 illustrate that the pressure measuring sensor 140 is inserted through the through part formed in the upper part of the chamber cover 102 to be connected to the inside of the chamber 100, but any arrangement in close contact with the small cell 10 and/or the interior of the chamber 100 may be used without limitation. As a result, the pressure measuring sensor 140 may sensitively sense the pressure according to the volume change in the small cell 10 and the chamber 100, and may measure the instantaneous pressure at the time of explosion of the small cell 10. The measured pressure may be provided to the controller 150, and the pressure information may be stored by the controller 150. The pressure measuring sensor 140 is not particularly limited as long as it detects a pressure change by sensing a pressure inside the small cell 10 and/or the chamber 100.

The step (S500) of converting to the pressure of the medium-large cell module may be a step of converting the measured pressure during explosion of the small cell 10 into the pressure of the medium-large cell module. At this time, the pressure of the medium-large cell module may be converted by the following equation.

$$P_{md} = P_s \times \frac{C_{ml}}{C_s} \times N_{md} \qquad \text{[Equation]  5}$$

In the above equation, $P_{md}$ is the explosion pressure of the medium-large cell module, $P_s$ is the explosion pressure of the small cell, $C_{ml}$ is the capacity of the medium-large cell, $C_s$ is the capacity of the small cell, and $N_{md}$ is the number of cells of the medium-large cell module.

Here, when the number of cells of the medium-large cell module is one, it is possible to predict the explosion pressure of the medium-large cell itself, and when the number of cells is two or more, it is possible to predict the explosion pressure of the medium-large cell module. Accordingly, modules as well as medium and large cells can be simulated with small cells and predict explosion pressure.

The explosion pressure of the small cell 10 measured by the pressure measuring sensor 140 in the previous step may be transmitted to the output unit 160 by the controller. The output unit 160 converts the explosion pressure of the medium-large cell module by substituting the explosion pressure of the transmitted small cell 10 into the equation, and the user confirms this.

Meanwhile, the medium-large cell module is used in medium-large devices such as notebooks and electric vehicles, and one or more medium-large cells respectively having a capacity of 20 Ah or more may be connected in parallel and/or in series. The medium-large cell module may be used as a power source of an electric vehicle, a hybrid electric vehicle, a plug-in hybrid electric vehicle, or a power storage device.

Hereinafter, the present invention will be described in detail with reference to Examples, but the following Examples are merely to illustrate the present invention, and the present invention is not limited by the following Examples.

Example 1

A medium-large cell module, in which 12 cells having a capacity of 61 Ah were connected in series, was prepared. The charging current was applied to the medium-large cell module to perform the overcharging while measuring the generated temperature and the voltage according to the charge amount (SOC), thereby obtaining an SOC-temperature profile as shown in FIG. 5 (profile 4 in FIG. 5).

Example 2

A medium-large cell module, in which 12 cells having a capacity of 73 Ah were connected in series, was prepared. The charging current was applied to the medium-large cell module to perform the overcharging while measuring the generated temperature according to the charge amount (SOC), thereby obtaining an SOC-temperature profile as shown in FIG. 6 (profile 2 in FIG. 6).

Referring to FIGS. 5 and 6, it can be seen that as the capacity of the medium-large cell module is changed, the SOC-temperature profile becomes different. This means that in the present invention predicting the explosion pressure of the medium-large cell using the explosion pressure of the small cell, the simulation conditions are changed as the capacity of the medium-large cell module is changed. That is, since the temperature condition, which is a simulation condition of the medium-large cell module, depends on the capacity of the medium-large cell module, in order to predict the explosion pressure of the medium-large cell module of the present invention, first of all, it is necessary to obtain a corresponding SOC-temperature profile according to the capacity of the medium-large cell module to be predicted.

Example 3

After preparing a small cell (1 Ah) having a capacity of 1 Ah, the small cell was mounted in the mounting portion inside the chamber of the explosion pressure measuring system of the present invention. Thereafter, the SOC temperature profile obtained in Example 1 was inputted to the controller. Subsequently, the charge/discharge unit is operated to apply a charging current to the small cell and perform overcharging, and at the same time, overcharging was performed until the explosion of the small cell while heating the first heating plate and the second heating plate, which are heating members, in the same manner as the SOC temperature profile (overcharging by adjusting the temperature of the heating plate according to the charge amount as shown in profile 5 of FIG. 5).

The pressure measuring sensor measures the pressure generated when the small cell is exploded, and transmits the measured pressure value to the controller and the output unit to convert the explosion pressure of the medium-large cell module by the following equation. The explosion pressure of the measured small cell was measured as 0.2 bar, and the explosion pressure of the medium-large cell module converted by the equation was 146 bar.

$$P_{md} = P_s \times \frac{C_{ml}}{C_s} \times N_{md} \qquad \text{[Equation]}$$

In the above equation, $P_{md}$ is the explosion pressure of the medium-large cell module, $P_s$ is the explosion pressure of the small cell, $C_{ml}$ is the capacity of the medium-large cell, $C_s$ is the capacity of the small cell, and $N_{md}$ is the number of cells of the medium-large cell module.

Reference Example 1

A small cell (1 Ah) having a capacity of 1 Ah was prepared and then mounted in a general explosion pressure measuring device. Thereafter, overcharging was performed while applying a charging current to the small cell.

Reference Example 2

After preparing a small cell having a capacity of 1.5 Ah, the small cell was overcharged in the same device and under the same conditions as in Example 3, and the pressure at explosion was measured. The explosion pressure of the small cell measured was 0.3 bar.

[Experimental Example] Voltage Profile Measurement According to Charge Amount (SOC-Voltage Profile)

When performing the overcharge in Examples 1 to 3 and Reference Example 1, the voltage was measured according to the charge amount and the results are shown in FIG. 5.

The first profile of FIG. 5 is the SOC-voltage profile of Reference Example 1 in which the small cell is simply overcharged. Referring to this, it can be seen that the small cell does not explode only by simple overcharging without heating the cell.

Profile 2 of FIG. 5 is the SOC-voltage profile of the small cell overcharged under the medium-large cell module simulation conditions of Example 3, and Profile 3 of FIG. 5 is the SOC-voltage profile of the medium-large cell module of Example 1. Referring to them, it can be seen that the profile behaviors of profiles 2 and 3 are almost identical. This means that when the small cell is heated and charged under the same conditions as the SOC-temperature profile of the medium-large cell, the SOC-voltage profile behavior of the medium-large cell is shown. Therefore, even if the explosion pressure of the medium-large cell is not directly measured, the explosion pressure of the medium-large cell can be estimated using the small cell.

Referring to profile 3 of FIG. 5, which is the SOC-voltage profile of the medium-large cell module of Example 1, it can be seen that the medium-large cell module of Example 1 exploded at a point of about SOC 147%, and referring to profile 2 of FIG. 5, which is the SOC-voltage profile of the small cell of Example 3 simulating this, it can be seen that the small cell of Example 3 also exploded at a point of SOC 147%. In addition, referring to profile 1' of FIG. 6, which is the SOC-voltage profile of the medium-large cell module of Example 2, it can be seen that the medium-large cell module of Example 2 exploded at a point of about SOC 122%.

On the other hand, the explosion pressure of the small cell having 1.5 Ah capacity of Reference Example 2 is 0.3 bar, which is 1.5 times the explosion pressure of 0.2 bar, which is the explosion pressure of the small cell having the 1 Ah capacity of Example 3. Hence, it can be seen that the explosion pressure is proportional to the capacity of the cell. In order to confirm the accuracy of the present invention for estimating the explosion pressure of a medium-large cell using a small cell, it is desirable to actually measure the explosion pressure of a medium-large cell and compare the actual measured value with the predicted value using the present invention. However, as a matter of safety, there is a practical limitation that cannot measure the explosion pressure of a medium-large cell module having a large capacity as in the embodiment, and accurate measurement may be difficult due to the structural deformation of the explosion measuring device during explosion. Hence, the above description will replace the description of the accuracy of the explosion pressure prediction (measurement) method of the present invention.

As such, according to the present invention, by exploding the small cell under the simulated condition of the medium-large cell, measuring the pressure at the explosion, and converting the measured pressure value into the explosion pressure of the medium-large cell module, it is possible to predict the explosion pressure of the medium-large cell module, and accordingly it is possible to prevent accidents and structural deformation of the measuring device by ignition, explosion, etc. which may occur during safety testing of medium-large cell modules.

Although the above has been described with reference to a preferred embodiment of the present invention, it can be understood that those skilled in the art can make various modifications and changes to the present invention without departing from the spirit and scope of the invention as set forth in the claims below.

Therefore, the technical scope of the present invention should not be limited to the contents described in the detailed description of the specification but should be defined by the claims.

DESCRIPTION OF REFERENCE NUMERALS

1000: explosion pressure measuring system of medium-large cell module
10: cell
100: chamber
110: heating member
100: temperature control unit
130: charge/discharge unit
140: pressure measuring sensor
1: SOC-voltage profile of Reference Example 1
2: SOC-voltage profile of the small cell of Example 3
3: SOC-voltage profile of the medium-large cell module of Example 1
4: SOC-temperature profile of the medium-large cell module of Example 1
5: SOC-heating temperature of the small cell of Example 3
1': SOC-voltage profile of the medium-large cell module of Example 2
2': SOC-temperature profile of the medium-large cell module of Example 2

The invention claimed is:

1. A method for predicting an explosion pressure of a medium-large cell module, the method comprising:
deriving a SOC-temperature profile of a generated temperature according to a charge amount (SOC) of the medium-large cell module (S100);
mounting a small cell inside an explosion pressure measuring device (S200);
heating the small cell in a same manner as the SOC-temperature profile and overcharging the small cell until the small cell is exploded (S300);
measuring a pressure when the small cell is exploded (S400); and
converting the measured pressure of the small cell into an explosion pressure of the medium-large cell module (S500).

2. The method of claim 1, wherein in the converting the measured pressure (S500), a pressure of the medium-large cell module is calculated by substituting the pressure measured at the explosion of the small cell with an equation, $$P_{md} = P_s \times \frac{C_{ml}}{C_s} \times N_{md} \quad \text{[Equation]}$$

wherein in the above equation, $P_{md}$ is the explosion pressure of the medium-large cell module, $P_s$ is the pressure when the small cell is exploded, $C_{ml}$ is a capacity of the medium-large cell, $C_s$ is a capacity of the small cell, and $N_{md}$ is a number of cells of the medium-large cell module.

3. The method of claim 1, wherein in the deriving the SOC-temperature profile (S100), the SOC-temperature profile is different by capacities of the medium-large cell module.

4. The method of claim 1, wherein the small cell has a capacity of 1.0 Ah or less.

5. The method of claim 1, wherein the medium-large cell module includes one or more medium-large cells having a capacity of 20 Ah or more, which are electrically connected to each other.

6. The method of claim 1, wherein in the overcharging the small cell (S300), a charging current is applied and at the same time, a voltage of the small cell is measured concurrently.

7. The method of claim 1, wherein the medium-large cell module is a power source of an electric vehicle, a hybrid electric vehicle, a plug-in hybrid electric vehicle, or a power storage device.

8. A system for predicting an explosion pressure of a medium-large cell module, the system comprising:
- a chamber having a heating member disposed therein and including a mounting portion for mounting a small cell on the heating member;
- a temperature control unit connected to the heating member to adjust a temperature of the heating member;
- a charge/discharge unit electrically connected to the small cell;
- a pressure measuring sensor located on one side of the chamber; and
- a controller configured to control the temperature control unit, the charge/discharge unit, and the pressure measuring sensor;

wherein the controller controls the charge/discharge unit and the temperature control unit in order to heat the small cell in a same manner as a SOC-temperature profile of the medium-large cell module.

9. The system of claim 8, wherein the heating member includes a first heating plate and a second heating plate, and
wherein a mounting portion is provided between the first heating plate and the second heating plate.

10. The system of claim 8, wherein the chamber has a through portion formed at the one side, and is connected to the pressure measuring sensor through the through portion.

11. The system of claim 8, wherein the chamber includes: a chamber body having a hollow structure with an open top; and a chamber cover coupled with the open top of the chamber body to seal the mounted small cell.

12. The system of claim 8, further comprising an output unit configured to convert a pressure of the small cell measured by the pressure measuring sensor to a pressure of the medium-large cell module.

* * * * *